(12) United States Patent
Wada

(10) Patent No.: US 11,421,623 B2
(45) Date of Patent: Aug. 23, 2022

(54) INTERNAL COMBUSTION ENGINE CONTROL DEVICE

(71) Applicant: DENSO CORPORATION, Kariya (JP)

(72) Inventor: Masatake Wada, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 16/928,141

(22) Filed: Jul. 14, 2020

(65) Prior Publication Data

US 2020/0340422 A1    Oct. 29, 2020

Related U.S. Application Data

(63) Continuation of application No. PCT/JP2019/001636, filed on Jan. 21, 2019.

(30) Foreign Application Priority Data

Jan. 29, 2018   (JP) .............................. JP2018-013054

(51) Int. Cl.
| | | |
|---|---|---|
| F02D 41/00 | (2006.01) | |
| F02D 41/40 | (2006.01) | |
| F02P 5/06 | (2006.01) | |
| F02D 41/38 | (2006.01) | |
| F02D 43/00 | (2006.01) | |

(52) U.S. Cl.
CPC ........... *F02D 43/00* (2013.01); *F02D 41/009* (2013.01); *F02D 41/402* (2013.01); *F02P 5/06* (2013.01); *F02D 2041/389* (2013.01); *F02D 2200/0602* (2013.01)

(58) Field of Classification Search
CPC ...... F02D 43/00; F02D 41/009; F02D 41/402; F02D 41/405; F02D 2041/389
See application file for complete search history.

(56) References Cited

U.S. PATENT DOCUMENTS

2002/0020386 A1*  2/2002  Ogawa .................... F02D 37/02
                                                                  123/295

FOREIGN PATENT DOCUMENTS

| JP | 2002-038993 | 2/2002 |
| JP | 2005-061332 | 3/2005 |
| JP | 2006-169976 | 6/2006 |
| JP | 2006-257921 | 9/2006 |
| JP | 2015-151977 | 8/2015 |

* cited by examiner

*Primary Examiner* — Phutthiwat Wongwian
*Assistant Examiner* — Anthony L Bacon
(74) *Attorney, Agent, or Firm* — Nixon & Vanderhye P.C.

(57) ABSTRACT

An ECU causes an injector to implement multiple split injections during a combustion cycle and to implement a final split injection among the split injections in the latter half of the compression stroke. The ECU further sets a time interval between the injection timing for the final split injection and the ignition timing of an ignition plug at a constant time in a region in which the fuel pressure is the same. Then, the ECU sets a crank angle position based on the time interval and a rotational speed of an output shaft.

8 Claims, 4 Drawing Sheets

INTERNAL COMBUSTION ENGINE CONTROL DEVICE

CROSS REFERENCE TO RELATED APPLICATION

The present application is a continuation application of International Patent Application No. PCT/JP2019/001636 filed on Jan. 21, 2019, which designated the U.S. and claims the benefit of priority from Japanese Patent Application No. 2018-013054 filed on Jan. 29, 2018. The entire disclosures of all of the above applications are incorporated herein by reference.

TECHNICAL FIELD

The present disclosure relates to a control device for an internal combustion engine.

BACKGROUND

Conventionally, internal combustion engine has various configurations. For example, internal combustion engines of a direct injection type is configured to cause a fuel injection valve to inject fuel directly to a combustion chamber of the internal combustion engine.

SUMMARY

According to one aspect of the present disclosure, an internal combustion engine includes a fuel injection valve to directly inject fuel into a combustion chamber and a spark plug to generate an ignition spark in the combustion chamber. A control device for the internal combustion engine, comprises an injection control unit configured to cause the fuel injection valve to implement split injections for a plurality of times in one combustion cycle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
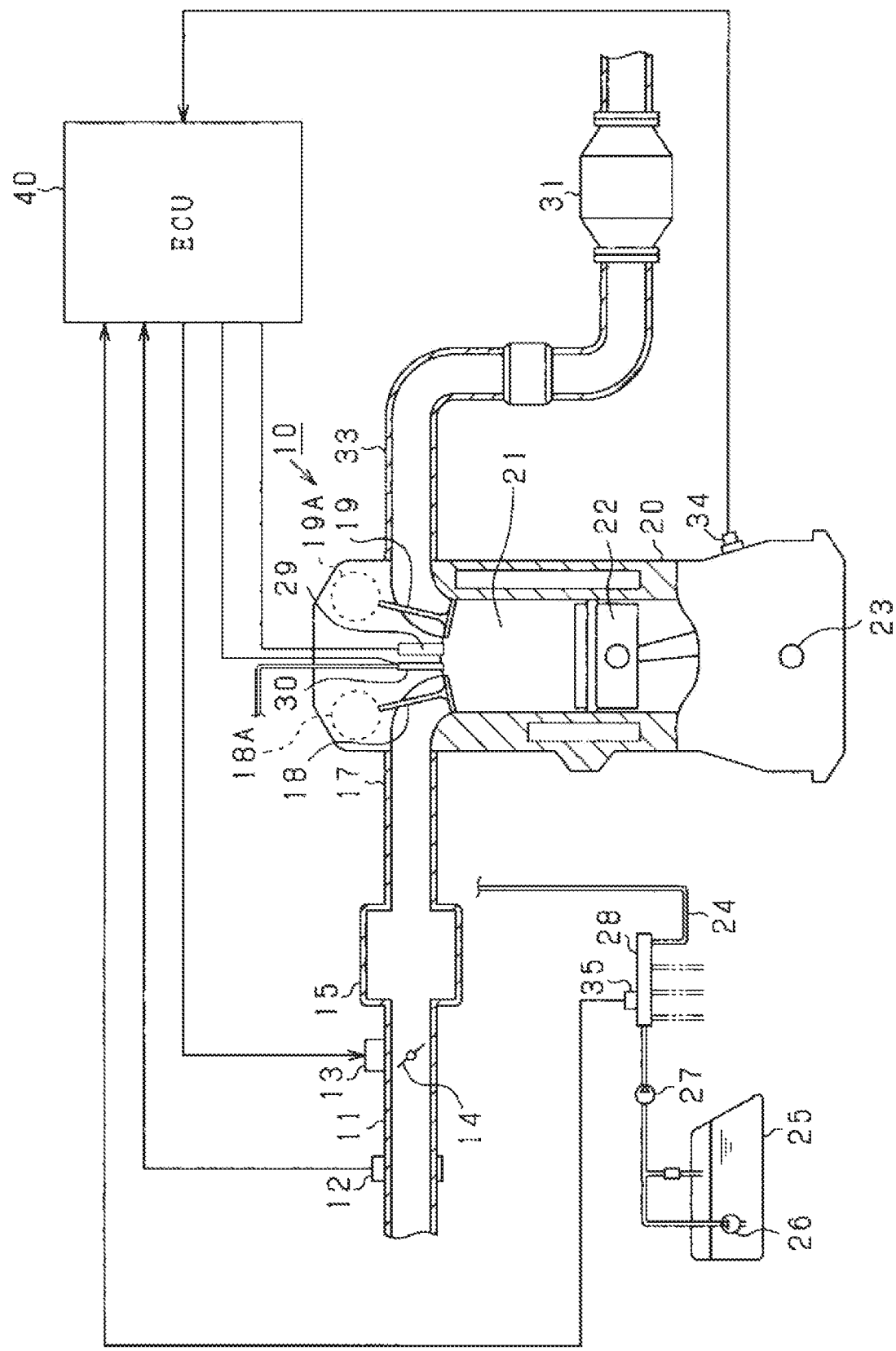
FIG. 1 is a configuration diagram showing an engine control system.

Hereinafter, example of the present disclosure will be described.

According to one example of the present disclosure, an internal combustion engine of a direct injection type causes a fuel injection valve to inject fuel directly into a fuel chamber of the internal combustion engine. In an assumable configuration, an internal combustion engine of a direct injection type employs a control scheme to split a total injection amount, by which fuel is injected in one combustion cycle, into multiple amounts and to cause a fuel injection valve to inject fuel by each of the amounts. Further in assumable configuration, the final split injection is implemented in the latter half of a compression stroke to make a rich state locally around an ignition position of a spark plug in a combustion chamber, thereby to enhance combustibleness of the internal combustion engine.

Further, in an assumable configuration, an injection timing of each split injection is determined by a crank angle indicating a rotation angle of the output shaft. In this configuration, presumably, the ignition timing of the spark plug is determined based on the crank angle. In this presumable configuration, the interval from the injection timing of the final split injection to the ignition timing is specified by the crank angle and, consequently, may be influenced by the rotational speed of the output shaft. Due to this, a concern arises that the time since fuel is injected in the final split injection until the ignition timing would vary according to the rotation speed of the output shaft. As a result, accompanying a change in the rotational speed of the output shaft, the diffusion state of fuel spray formed around the ignition position in the combustion chamber may change. Consequently, the combustibleness of the internal combustion engine could be degraded.

In consideration of the above issue, a control device according to one example of the present disclosure is for an internal combustion engine, and the internal combustion engine includes a fuel injection valve to directly inject fuel into a combustion chamber and a spark plug to generate an ignition spark in the combustion chamber. The control device comprises an injection control unit configured to cause the fuel injection valve to implement split injections for a plurality of times in one combustion cycle and to implement a final split injection among the split injections in a latter half of a compression stroke. The control device comprises a time setting unit configured to set a time interval, which is from an injection timing of the final split injection to an ignition timing of the spark plug, to a constant time in a region in which a fuel pressure is the same. The control device comprises an injection timing setting unit configured to set a crank angle position indicating the injection timing of the final split injection based on the time interval set by the time setting unit and a rotation speed of an output shaft of the internal combustion engine.

In the combustion chamber, the diffusion state of the fuel spray formed around the spark position is determined according to the time since the final split injection is implemented on condition that the fuel pressure is in the same fuel pressure region. In the present disclosure, the time interval from the injection timing of the final split injection until the ignition timing of the spark plug is set to the constant time in the region in which the fuel pressure becomes the same. The crank angle position indicating the injection timing of the final split injection is set based on the time interval and the rotational speed of the output shaft of the internal combustion engine. In this one example, in a case where the fuel pressure is in the same fuel pressure region, the time since the final split injection is implemented until the ignition timing is set to the constant time. Therefore, the configuration may enable the fuel spray formed by the final split spray to be properly diffused around the ignition position and may enable the combustion state of the internal combustion engine to be appropriate.

Hereinbelow, an embodiment will be described with reference to the drawings. In the embodiment, an engine control system is for a multicylinder 4-cycle gasoline engine of a direct injection type as an internal combustion engine.

An engine control system illustrated in FIG. 1 has an engine 10 and an ECU 40 as a control device. The engine 10 is a 4-cylinder engine having four cylinders. In FIG. 1, only one cylinder is illustrated, and other cylinders are not illustrated.

The engine 10 has an engine body 20 provided with cylinders. A combustion chamber 21 is a space in the cylinder and is defined by the cylinder inner wall and the top face (top part) of a piston 22.

A cylinder head positioned in the upper part of the engine body 20 is provided with a spark plug 29 for each combustion chamber 21. To the spark plug 29, an ignition pulse is applied in a desired ignition timing by using a not-illustrated ignition coil or the like. By the application of the ignition pulse, an ignition spark is generated between opposed electrodes of each spark plug 29.

The engine body 20 is provided with an injector 30 as a fuel injection valve for each combustion chamber 21. The injector 30 is of a center injection type which is placed near the spark plug 29 in the cylinder head and injects fuel directly into the combustion chamber 21 from the top side toward the bottom side of the combustion chamber 21. The injector 30 is of an electromagnetic driving type. Through a not-illustrated drive circuit, a drive pulse is applied at a desired injection timing. By the application of the drive pulse, the valve of the injector 30 is open and fuel is injected.

The injector 30 is connected to a fuel tank 25 via a fuel line 24. The fuel in the fuel tank 25 is pumped up by a low-pressure pump 26 and pressurized by a high-pressure pump 27. By controlling the driving of the high-pressure pump 27, the pressure applied to the fuel can be variably set. The high-pressure fuel pressurized by the high-pressure pump 27 is pressure-fed to a delivery pipe 28 and supplied to the injector 30 in each of the cylinders from the delivery pipe 28. The delivery pipe 28 is provided with a fuel pressure sensor 35 detecting the pressure of the fuel supplied to the injector 30 as fuel pressure Pf.

An intake port and an exhaust port of the engine body 20 are provided with an intake valve 18 and an exhaust valve 19, respectively which perform opening/closing operations according to the rotation of a not-illustrated camshaft. Intake air flowing in an intake passage 11 by the opening operation of the intake valve 18 is introduced into the combustion chamber 21. Exhaust gas after combustion is discharged to an exhaust passage 33 by the opening operation of the exhaust valve 19. The intake valve 18 and the exhaust valve 19 are provided with variable valve mechanisms 18A and 19A which vary opening/closing timings of the intake valve 18 and the exhaust valve 19, respectively. The variable valve mechanisms 18A and 19A adjust relative rotation phases between the crankshaft of the engine 10 and the camshafts of intake and exhaust, and the phase adjustment to the advance side and the retard side with respect to a predetermined reference position can be performed.

The engine body 20 is provided with a crank angle sensor 34 outputting a crank angle signal in a rectangular shape every predetermined crank angle at the time of operation of the engine 10. The ECU 40 is configured to detect the rotational speed of an output shaft 23 as rotation speed NE on the basis of the crank angle signal.

The intake passage 11 is provided with an air flow meter 12 for detecting an intake air amount. On the downstream side of the air flow meter 12, a throttle valve 14 whose angle is adjusted by a throttle actuator 13 such as a DC motor is provided. On the downstream side of the throttle valve 14, a surge tank 15 is provided. An intake manifold 17 for introducing air into each of the cylinders of the engine 10 is connected to the surge tank 15, and the surge tank 15 is connected to the intake ports of the cylinders in the intake manifold 17.

The exhaust passage 33 is provided with a catalyst 31 such as a three-way catalyst for cleaning CO, HC, NOx, or the like in exhaust gas.

Outputs of the above-described various sensors are sent to the ECU 40. The ECU 40 has a microcomputer including a CPU, a ROM, a RAM, and the like, and executing various control programs stored in the ROM to perform control of a fuel injection amount of the injector 30 in accordance with the engine operation state, variable setting of the ignition timing of the spark plug 29, and variable control of fuel pressure by the high-pressure pump 27. In the embodiment, the ECU 40 corresponds to an ignition timing setting unit.

Figure 2:
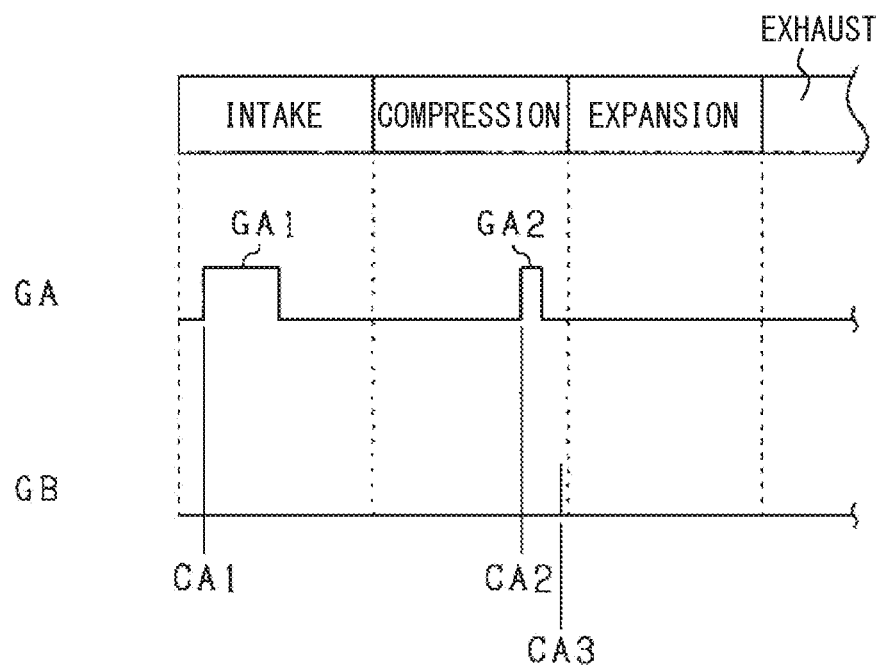
FIG. 2 is an explanatory timing chart showing injection timings of split injections.

FIG. 2 is a timing chart illustrating transition of drive pulses GA1 and GA2 of the injector 30 and a spark pulse GB of the spark plug 29 in one combustion cycle.

The ECU 40 executes split injection control to split the total injection amount injected into the combustion chamber 21 in one combustion cycle to multiple times and to cause the injector 30 to inject fuel. Specifically, in the split injection control, split injection in the injector 30 is performed by the drive pulse GA1 once or twice in the intake stroke and, after that, the final split injection in the injector 30 is performed by the drive pulse GA2 in the latter half of the compression stroke. An injection timing CA1 indicates a crank angle position at which split injection in the intake stroke starts and is, in the embodiment, the timing at which the drive pulse GA1 rises. An injection timing CA2 indicates a crank angle position at which the split injection in the latter half of the compression stroke starts and is, in the embodiment, the timing at which the drive pulse GA2 rises. An ignition timing CA3 indicates a crank angle position in which the spark plug 29 fires and is, in the embodiment, a timing at which the ignition pulse GB rises. The crank angle position indicates the rotation position of the output shaft 23 and, in the embodiment, also represents the timing defined by the rotation position. Hereinafter, the injection timing CA2 in the final split injection will be also simply referred to as the final injection timing CA2. In the embodiment, the ECU 40 corresponds to an injection control unit.

The fuel is injected from injection holes of the injector 30 at each of the injection timings CA1 and CA2. After that, the fuel becomes fuel spray which reaches the periphery of the electrode of the spark plug 29 or around the electrode and is ignited by an ignition spark of the spark plug 29.

Figure 3:
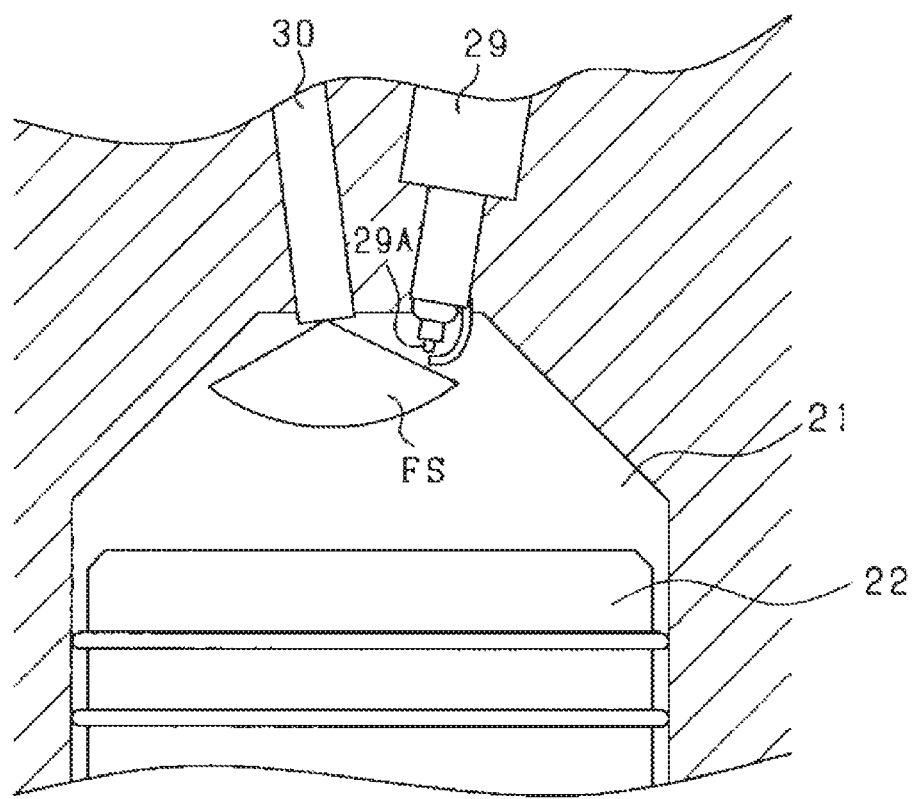
FIG. 3 is a diagram illustrating diffusion of fuel spray in a combustion chamber.

FIG. 3 illustrates a diffusion state of fuel spray FS formed by the final split injection. Since the final split injection among the split injections is implemented in the latter half of the compression stroke, the periphery or vicinity of an electrode 29A of the spark plug 29 becomes locally richer than air-fuel mixture in the cylinder immediately before ignition of the spark plug 29. At the ignition timing CA3, fire igniting the fuel spray spreads in the combustion chamber 21 and combustion of the air-fuel mixture is accelerated. The periphery or vicinity of the electrode of the spark plug 29 in the combustion chamber 21 is also referred to as an ignition position.

When the fuel spray in a proper diffusion state can be formed in the periphery or vicinity of the ignition position, combustibleness of the engine 10 can be enhanced. The diffusion state of the fuel spray changes according to the length of the interval indicating the distance from the final injection timing CA2 to the ignition timing CA3. Specifically, the longer the interval is, the larger the diffusion state from the top side toward the bottom side of the combustion chamber 21 in the fuel spray becomes. The shorter the interval is, the smaller the diffusion state from the top side toward the bottom side of the combustion chamber 21 in the fuel spray becomes.

To implement each split injection in a desired timing in one combustion cycle, each of the injection timings CA1 and CA2 is determined by the crank angle position indicating the rotation angle position of the output shaft 23. The ignition timing CA3 of the spark plug 29 is determined by the crank angle position. Consequently, the interval indicating the distance from the final injection timing CA2 to the ignition timing CA3 is specified by the crank angle position, and is influenced by the rotation speed NE of the output shaft 23. Even when the same interval is specified in the crank angle position, the larger the rotation speed NE becomes, the shorter the time of the interval becomes. The lower the rotation speed NE becomes, the longer the time of the interval becomes. Consequently, according to the rotation speed NE, the diffusion state of the fuel spray formed around the ignition position changes, and the combustibleness in the combustion chamber 21 may deteriorate. For example, when the rotation speed doubles from 1000 rpm to 2000 rpm, the interval becomes half of the time.

The inventors of the present disclosure paid attention to the fact that, in the combustion chamber 21, the diffusion state of the fuel spray formed around the ignition position is determined according to the time from the final injection timing CA2 in a case where it is in the same fuel pressure region. The inventors also paid attention to the fact that, when the pressure of the fuel is constant, the diffusion state of the fuel spray accompanying time lapse is the same. Consequently, the ECU 40 sets the interval from the final injection timing CA2 to the ignition timing CA3 to a predetermined time in a region where the fuel pressure Pf is the same. The ECU 40 sets the final injection timing CA2 by the crank angle position on the basis of the set time interval and the rotation speed NE of the output shaft 23.

Figure 4:
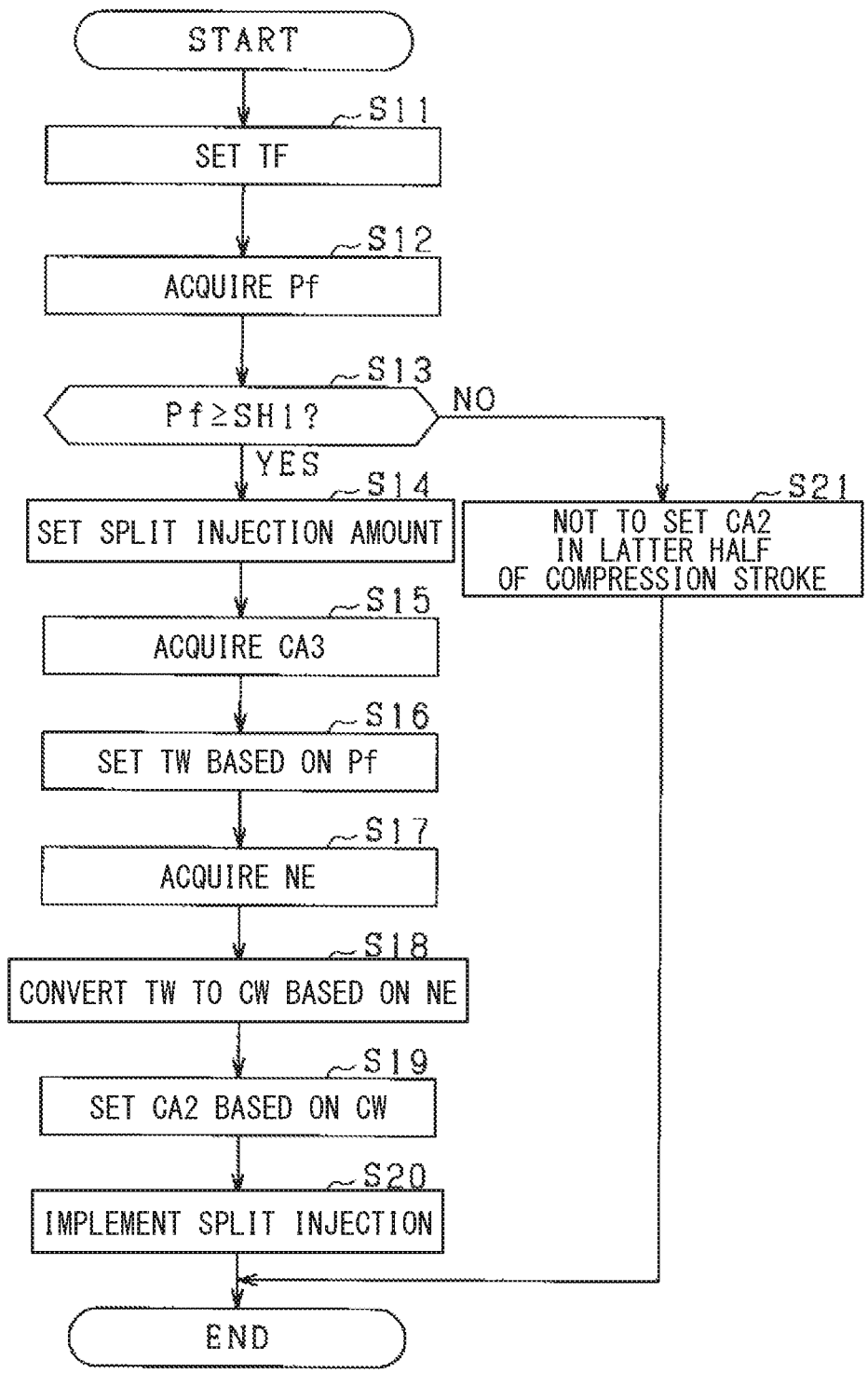
FIG. 4 is a flowchart showing procedure of split injection control.

Next, the procedure of the split spray control in the embodiment will be described with reference to FIG. 4. The processes illustrated in FIG. 4 are repeatedly executed in predetermined cycles by the ECU 40.

In step S11, a total injection amount FT in one combustion cycle is set. For example, according to the operation state of the engine 10, the total injection amount FT is set.

In step S12, the present fuel pressure Pf is acquired from the detection value of the fuel pressure sensor 35.

The higher the fuel pressure Pf is, the more atomization of the fuel spray is promoted. Consequently, when split injection is performed in the latter half of the compression stroke in the case where the fuel pressure Pf is low, a concern arises that vaporization of the fuel spray does not likely occur. In the embodiment, therefore, when the value of the fuel pressure Pf is smaller than a fuel pressure determination value SH1, the split injection in the latter half of the compression stroke is not implemented.

In step S13, determination is made whether the fuel pressure Pf acquired in step S12 is a value smaller than the fuel pressure determination value SH1 or not. For example, the fuel pressure determination value SH1 is determined as the fuel pressure Pf, at which unburnt gas or PM in exhaust becomes a predetermined value or larger, when the split injection in the latter half of the compression stroke is performed in the engine 10. When it is determined that the fuel pressure Pf is smaller than the fuel pressure determination value SH1, the process advances to step S21. Step S13 corresponds to a determining unit.

In step S21, the split injection by the injector 30 is performed so as not to set the final injection timing CA2 in the latter half of the compression stroke. In the embodiment, the injection timings CA1 and CA2 of the split injections of twice are set before the latter half of the compression stroke, and the split injection by the injector 30 is implemented. Alternately, in step S21, the injector 30 may be caused to inject the total injection amount FT once in the intake stroke.

On the other hand, when it is determined that the fuel pressure Pf is equal to or larger than the fuel pressure determination value SH1, the process advances to step S14. In step S14, the split injection amount injected by each split injection is set on the basis of the total injection amount FT which is set in step S11. In the embodiment, to set the dispersibility of the fuel spray to the same condition, the injection amount by the final split injection is set to the same value regardless of the rotation speed NE. The split injection amount in the final split injection is set to a value smaller than the split injection amount in the split injection of the first time.

In step S15, the ignition timing CA3 at which ignition of the spark plug 29 starts is acquired.

In step S16, based on the fuel pressure Pf acquired in step S12, the interval from the final injection timing CA2 to the ignition timing CA3 is set as a time interval TW which is determined in actual time. The value of the time interval TW is determined according to the time in which fuel spray that causes the combustibility of the engine 10 proper is formed. More Specifically, the value of the time interval TW represents time required for fuel spray formed by fuel injection of the injector 30 reaches or comes close to the position of the electrode 29A of the spark plug 29. Step S16 corresponds to a time setting unit.

Figure 5:
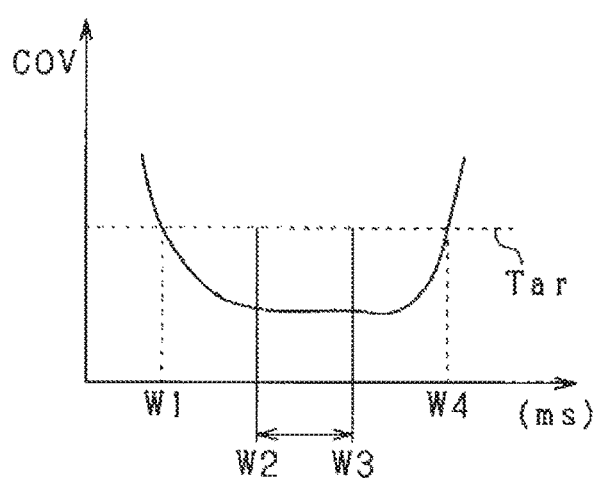
FIG. 5 is an explanatory diagram showing a method of determining a time conversion value.

FIG. 5 is a diagram for explaining a method of determining the time interval TW in a desired fuel pressure region. In FIG. 5, the horizontal axis indicates interval determined by actual time, and the vertical axis indicates combustion stability index COV (coefficient of variation). The combustion stability index COV is an index indicating the degree from misfire of worst stability to complete combustion of highest stability in combustion of the engine 10, and the smaller the value of the index is, the higher the stability of combustion is.

In FIG. 5, in the range of the time interval from W1 to W4, the combustion stability index COV becomes a target value or less. In the range where the time interval is smaller than W1 and the range larger than W4, the combustion stability index COV is larger than the target value. That is, by setting the time interval TW to a time interval in the range from W1 to W4, the combustion stability index COV can be set to the target value or less, and combustion stability can be increased. In the embodiment, the time interval TW is determined in the range from W2 to W3 which is narrower than the range from W1 to W4 in consideration of disturbance and the like.

Figure 6:
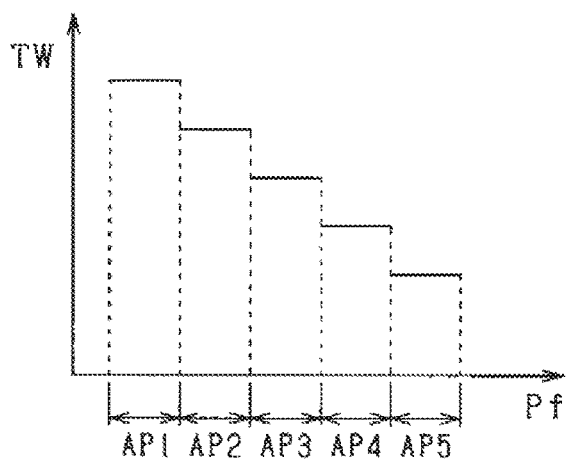
FIG. 6 is a diagram showing the relation between each fuel pressure region and time interval.

By the change in the fuel pressure Pf, the initial speed of the fuel injected by the injector 30 changes, and influence is exerted on the time in which the fuel spray is diffused to the vicinity of the ignition position. Specifically, the higher the fuel pressure Pf becomes, the shorter the time required for the fuel spray to be diffused to the vicinity of the ignition position becomes. In the embodiment, consequently, the larger the fuel pressure region AP to which the fuel pressure Pf acquired in step S12 belongs becomes, the smaller the time interval TW is set. FIG. 6 is a diagram for explaining the relation between the fuel pressure region AP and the time interval TW.

In FIG. 6, as an example, a fuel pressure range, which can be set by varying the fuel pressure Pf by the engine 10, is divided into five fuel pressure regions AP1, AP2, AP3, AP4, and AP5. In the embodiment, the fuel pressure regions AP1 to AP5 are determined equally. In FIG. 6, the larger the values of the fuel pressure regions AP1 to AP5 become, the smaller the time intervals TW associated with the fuel pressure regions AP1 to AP5 become. For example, a map defining the relations between the fuel pressure regions AP1 to AP5 and the time intervals TW is stored. Then, it suffices to refer to the map for the time intervals TW corresponding to the fuel pressure regions AP1 to AP5 to which the fuel pressure Pf acquired in step S12 belongs.

Referring again to FIG. 4, in step S17, the rotation speed NE of the output shaft 23 at present is acquired.

In step S18, based on the rotation speed NE acquired in step S17, the time interval indicated by the time interval TW which is set in step S16 is converted into an angle conversion value CW specified by the crank angle. The angle conversion value CW is a value indicating a change amount of the crank angle in the case where the output shaft 23 rotates only in the time interval TW at the present rotation speed NE. In the embodiment, the angle conversion value CW corresponds to an angle interval.

In the embodiment, the final injection timing CA2 is set in the latter half of the compression stroke. Therefore, it is desirable to set the maximum value of the angle conversion value CW at predetermined rotation speed NE to be equal to or less than a change amount from the crank angle position, which indicates the boundary between the first half of the compression stroke and the latter half of the compression stroke, to the crank angle position of the ignition timing CA3.

Figure 7:
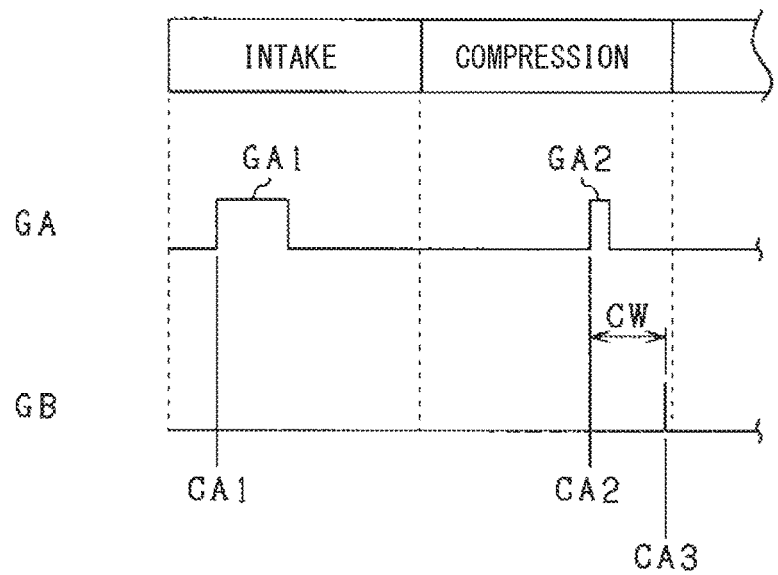
FIG. 7 is a timing chart showing injection timings of split injections and spark timings.

In step S19, the final injection timing CA2 is set on the basis of the angle conversion value CW acquired in step S18. In the embodiment, as illustrated in FIG. 7, the crank angle position, which is retarded from the ignition timing CA3 only by the angle conversion value CW, is set as the final injection timing CA2. Consequently, the interval from the final injection timing CA2 to the ignition timing CA3 is determined as a predetermined time (=TW) indicated by the angle conversion value CW. Steps S18 and S19 correspond to an injection timing setting unit.

Referring again to FIG. 4, in step S20, split injection is implemented. At this time, in an intake stroke, according to the injection timing CA1 of the split injection of the first time, the drive pulse GA1 is applied to the injector 30. After that, in the latter half of the compression stroke, the drive pulse GA2 is applied to the injector 30 in accordance with the final injection timing CA2.

The above-described embodiment produces the following effects.

The ECU 40 sets the time interval from the final injection timing CA2 to the ignition timing CA3 as the predetermined time interval TW in the region where the fuel pressure Pf is the same. Based on the set time interval TW and the rotation speed NE of the output shaft 23, the crank angle position indicating the final injection timing CA2 is set. In this case, the time from the final injection timing CA2 to the ignition timing CA3 is set to the constant time when it is in the same fuel pressure region AP. Therefore, the fuel spray formed by the final split injection can be diffused properly around the ignition position. As a result, the combustion state of the engine 10 can be made proper.

The ECU 40 converts the time interval TW into the angle conversion value CW specified by the crank angle on the basis of the rotation speed NE of the output shaft 23 of the engine 10 and sets the final injection timing CA2 from the ignition timing CA3 and the angle conversion value CW. In this case, in consideration of the rotation speed NE of the output shaft 23, the interval can be set, and the combustion state of the engine 10 can be made more appropriate.

The ECU 40 sets the time interval TW on the basis of the fuel pressure region AP to which the fuel pressure Pf belongs. Specifically, the larger the fuel pressure region AP to which the fuel pressure Pf belongs becomes, the smaller the time interval TW is set. In this case, the interval can be set by the time interval in which diffusivity of the fuel spray due to a change in the fuel pressure is considered, and the combustion state of the engine 10 can be made more appropriate.

The ECU 40 sets the interval equally and, in addition, makes the fuel injection amount in the final split injection constant. In this case, the diffusivity of the fuel spray becomes the same condition regardless of the operation condition, so that the combustion state of the engine 10 can be made more appropriate.

The injector 30 is of the center injection type which is placed near the spark plug 29. The ECU 40 sets, as the time interval TW, time required for fuel injected from the injector 30 to reach the position of the electrode 29A of the spark plug 29 or its vicinity. In this case, fuel spray injected by the injector 30 immediately reaches the vicinity of the ignition position so that the influence of air current in the combustion chamber 21 can be reduced, and the combustion state of the engine 10 can be made more appropriate.

In the ECU 40, when it is determined that the fuel pressure Pf is equal to or larger than the predetermined fuel pressure determination value SH1, split injection in the latter half of the compression stroke is implemented. On the other hand, when it is determined that the fuel pressure Pf is smaller than the fuel pressure determination value SH1, the split injection in the latter half of the compression stroke is not implemented. In this case, in the engine 10, degradation of exhaust due to increase in fuel which is not vaporized can be suppressed.

Other Embodiments

In place of the spark plug 29 of the center injection type, the spark plug 29 of a side injection type of injecting fuel from the side direction of the combustion chamber 21 may be used. Also in this case, it is sufficient for the ECU 40 to set time required for fuel injected from the injector 30 to reach the position of the electrode 29A of the spark plug 29 or its vicinity as the time interval TW. In place of setting the final split injection amount constant regardless of the rotation speed NE, the final split injection amount may be varied according to the rotation speed NE.

The fuel pressure region may be also determined by splitting the fuel pressure range unequally in place of equally splitting the fuel pressure range which can be taken by the engine 10.

Although the present disclosure has been described according to the embodiments, it is to be understood that the present disclosure is not limited to the embodiments and the structures. The present disclosure also includes various modifications and changes in the equivalency range. In addition, various combinations and modes and other combinations and modes including only one element, or more or less also fall within the scope and idea range of the present disclosure.

The control device and its method described in the present disclosure may be realized by a dedicated computer provided by constructing a processor and a memory programmed to execute one or multiple functions embodied by a computer program. Alternatively, the control unit and its method described in the present disclosure may be realized by a dedicated computer provided by constructing a processor by one or more dedicated hardware logic circuits. Alternatively, the control unit and its method described in the present disclosure may be realized by one or more dedicated computers each constructed by a combination of a processor programmed to execute one or multiple functions and a processor constructed by a memory and one or more hardware logic circuits. A computer program may be stored in a computer-readable non-transitory tangible recording medium as an instruction executed by a computer.

What is claimed is:

1. A control device for an internal combustion engine, the internal combustion engine including a fuel injection valve to directly inject fuel into a combustion chamber and a spark plug to generate an ignition spark in the combustion chamber, the control device comprising:
an injection control unit configured to cause the fuel injection valve
to implement split injections for a plurality of times in one combustion cycle and
to implement a final split injection among the split injections in a latter half of a compression stroke;
a time setting unit configured to set a time interval, which is from an injection timing of the final split injection to an ignition timing of the spark plug, to a constant time in a region in which a fuel pressure is the same; and
an injection timing setting unit configured to set a crank angle position indicating the injection timing of the final split injection based on the time interval set by the time setting unit and a rotation speed of an output shaft of the internal combustion engine, wherein
the injection control unit is configured to set an injection amount of the final split injection to a constant injection amount, regardless of the rotation speed.

2. The control device for the internal combustion engine according to claim 1, further comprising:
an ignition timing setting unit configured to set the ignition timing, wherein
the injection timing setting unit is configured to convert the time interval set by the time setting unit into an angle interval specified by a crank angle based on the rotation speed of the output shaft of the internal combustion engine, and
the injection timing setting unit is configured to set the injection timing of the final split injection based on the ignition timing of the spark plug and the angle interval.

3. The control device for the internal combustion engine according to claim 1, wherein
the fuel pressure is set to be variable, and
the time setting unit is configured to set the time interval based on a fuel pressure region to which the fuel pressure belongs.

4. The control device for the internal combustion engine according to claim 1, wherein
the fuel injection valve is of a center injection type and is placed near the spark plug, and
the time setting unit is configured to set, as the time interval, a time required for fuel injected from the fuel injection valve to reach a position of an electrode of the spark plug or to reach a vicinity of the position of the electrode of the spark plug.

5. The control device for the internal combustion engine according to claim 1, further comprising:
a determining unit configured to determine whether the fuel pressure is smaller than a predetermined fuel pressure determination value, wherein
the injection control unit is configured
to cause the fuel injection valve to implement the split injection in the latter half of the compression stroke on determination that the fuel pressure is equal to or larger than the fuel pressure determination value and
to cause the fuel injection valve not to implement the split injection in the latter half of the compression stroke on determination that the fuel pressure is smaller than the fuel pressure determination value.

6. The control device for the internal combustion engine according to claim 1, wherein
the injection timing setting unit is configured to
convert the time interval into an angle conversion value, which indicates a change amount of the crank angle when the output shaft rotates at the rotation speed in the time interval, and
set the injection timing of the final split injection by retarding the crank angle from the ignition timing by the angle conversion value.

7. The control device for the internal combustion engine according to claim 6, wherein
the injection timing setting unit is configured to set a maximum value of the angle conversion value to be equal to or less than a change amount of the crank angle from a crank angle position, which indicates a boundary between a first half of a compression stroke of the the internal combustion engine and a latter half of the compression stroke, to a crank angle position of the ignition timing.

8. The control device for the internal combustion engine according to claim 6, wherein
the time setting unit is configured to set the time interval to the constant time in the region, in which the fuel pressure is the same, by retarding the crank angle from the ignition timing more, as the rotation speed of the output shaft increases, and by retarding the crank angle from the ignition timing less, as the rotation speed of the output shaft decreases.

* * * * *